(12) United States Patent
Clark (10) Patent No.: US 8,392,377 B2
(45) Date of Patent: Mar. 5, 2013

(54) METHOD FOR PERFORMING A FINE-GRAINED UNDO OPERATION IN AN INTERACTIVE EDITOR

(75) Inventor: David Albert Clark, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2204 days.

(21) Appl. No.: 10/996,254

(22) Filed: Nov. 23, 2004

(65) Prior Publication Data

US 2006/0129884 A1 Jun. 15, 2006

(51) Int. Cl.
*G06F 17/30* (2006.01)
(52) U.S. Cl. ............................................ 707/674
(58) Field of Classification Search .................. 707/203; 715/229, 255
See application file for complete search history.

(56) References Cited

U.S. PATENT DOCUMENTS

| 5,990,906 A * | 11/1999 | Hudson et al. ............... 345/666 |
| 6,108,668 A * | 8/2000 | Bates et al. .................. 707/203 |
| 2002/0063717 A1* | 5/2002 | Minner et al. ............... 345/557 |

* cited by examiner

Primary Examiner — Thu-Nguyet Le (57) ABSTRACT

A method and system for restoring, to a previous state, a single object whose state was modified in a group editing action wherein a plurality of objects, including the single object, were modified as a group. Prior to execution of the group editing action, restorative information, necessary to restore each of the objects to its state prior to being modified by the group editing action, is stored in a data structure. After execution of the group editing action, group edit restorative information indicating the state, after the execution of the group editing action, of each of the objects that were modified by the group editing action is stored in another data structure. The single object is restored to its previous state in accordance with the group edit restorative information corresponding to the single object, in response to an indication that one of the plurality of objects is to be restored to its previous state.

18 Claims, 8 Drawing Sheets

METHOD FOR PERFORMING A FINE-GRAINED UNDO OPERATION IN AN INTERACTIVE EDITOR

FIELD OF THE INVENTION

The present method relates generally to computer graphics editors, and in particular to a method for interactively performing a partial 'undo' of an editing operation wherein multiple objects are operated on as a group.

BACKGROUND

Most interactive editors allow users to undo editing operations and also to undo region or group operations that are performed on multiple objects at one time. However, previously existing editors do not allow users to undo a region operation one object or operation at a time. What is needed is an editor that provides users with the capability to perform a finer-grained undo to enable them to have control over the specific objects or operations that need to be undone (or re-done), which objects were previously operated on as a group. There are no known prior solutions to this editing problem.

SUMMARY

A method and system is provided for restoring, to a previous state, a single object whose state was modified in a group editing action wherein a plurality of objects, including the single object, were modified as a group. Prior to execution of the group editing action, restorative information necessary to restore each of the objects to its state prior to being modified by the group editing action is stored in a data structure. After execution of the group editing action, group edit restorative information indicating the state, after the execution of the group editing action, of each of the objects that were modified by the group editing action, is stored in another data structure. The single object is restored to its previous state in accordance with the group edit restorative information corresponding to the single object, in response to an indication that one of the plurality of objects is to be restored to its previous state.

DETAILED DESCRIPTION

In the process of editing a graphical drawing, it is often desirable to 'undo' (i.e., reverse) a part of an operation that was performed on a group of objects, to restore a single object modified by the group editing action to its original state that existed prior to execution of the editing action.

The present method provides the ability to undo, in an incremental manner, editing operations performed on a group or region of objects, to provide users of interactive editors with greater control over the undo operations. When interactively editing objects, many times a user will perform an operation (copy, move, delete) on a group of objects that are selected by specifying a region containing these objects on a display device. This operation may be performed on any number of objects and the operation is performed on all of them at once.

A user may often want to undo the operation on only a portion of the objects that were the targets of a group operation. The present method allows a user to undo the action performed on individual objects that were in the set of objects on which a group editing operation was performed. For example, if four objects were deleted with a single operation (a 'group' or 'region' delete), the user can undo the deletion of each object individually, whereas a normal undo would restore all four objects to their previous state in a single action.

Figure 1:
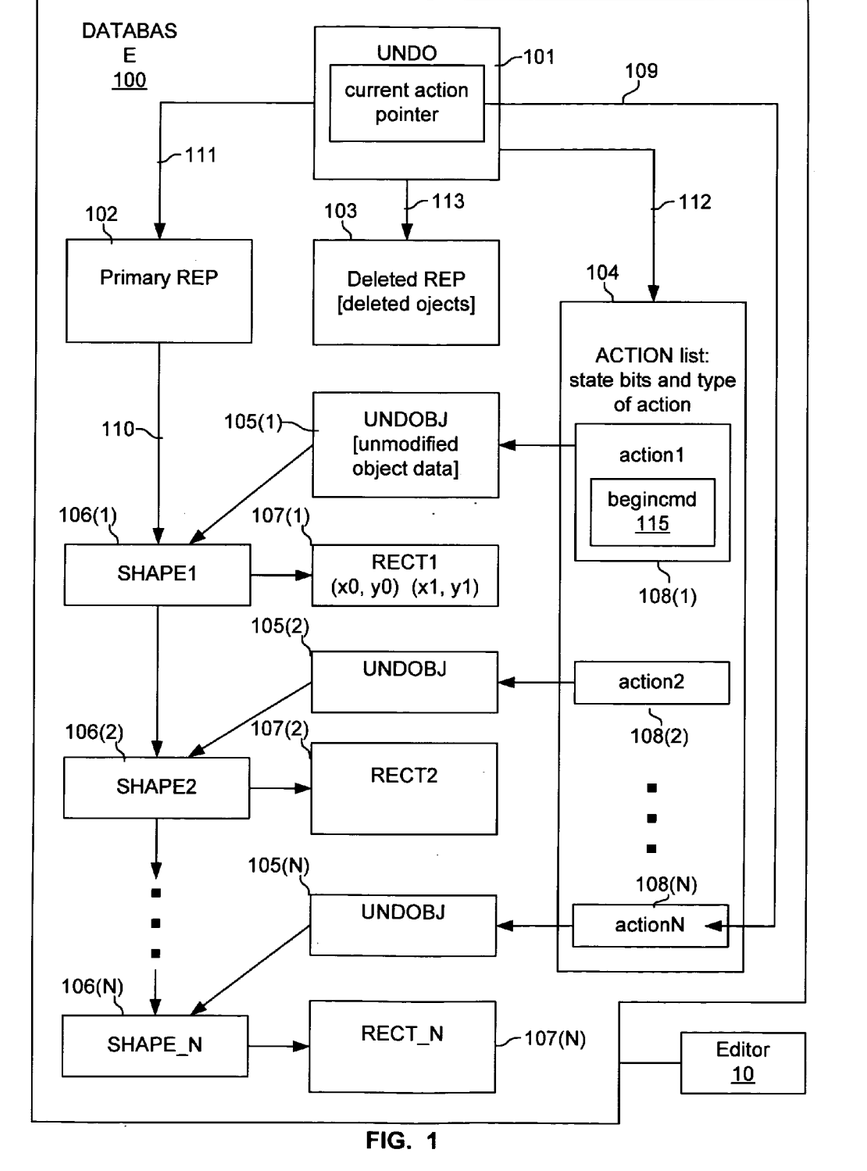
FIG. 1 is a diagram showing an exemplary set of data structures used by the present method.

FIG. 1 is a diagram showing an exemplary set of data structures (or records) used by the present method. As shown in FIG. 1, these data structures include an UNDO structure 101, a Primary REP (repository) 102, a Deleted REP (repository) 103, an ACTION list 104, a plurality of UNDOBJ structures 105(*) [where an "*" indicates any one of a number of similar items], a plurality of SHAPE structures 106(*), and a plurality of structures 107(*) for holding data describing the specific shapes indicated by a corresponding SHAPE structure 106. These data structures are stored in computer DATABASE 100, which is accessible to a batch-mode editor or interactive graphics editor 10. The editor 10 may be encoded on a computer-readable medium and include instructions executable on a processor for performing the methods described below.

UNDO structure 101 includes a pointer 113 to Deleted REP 103, a pointer 111 to primary REP 102, a pointer 112 to the ACTION list 104, and a current action pointer 109 that points to the next object that is to be undone, i.e., the next object that is to be restored to its state prior to a group editing action. If the user has already undone one or more actions, the current action pointer will point to the next action to undo if undo is called again.

Primary REP 102 includes updated information such as lists of rectangles, line, polygons, graphical text annotations, and hierarchy of other Primary REPs, (where a set of objects, such as RECTs 107(*), point to other Primary REPs so that a lower level block can be created that is included into higher level blocks multiple times). Deleted REP 103 includes a copy of the original data that is to be restored when an undo operation is performed. This original data includes lists of every graphical object represented by the Primary REP such as rectangles, lines, polygons, and so forth. ACTION list 104 includes a list of editing actions performed by the user, with each member 108(*) of the list including state bits or other indicia indicating the type of editing action performed on a particular object, and a 'begincmd' indicator 115 which indicates the last editing action (editing command) performed by the user.

UNDOBJ structures 105(*) contain original (intact) object data, including information such as font size, width of lines, old rectangle extent (for pull or stretch operation) list of old points when working with polygons or lines, and old strings when text is changed, and the like. Object data that is deleted is stored in its original form in Deleted REP 103. SHAPE structures are records 106(*) that include pointers to data that represents rectangles, lines, polygons, graphical text or hierarchical instances. These records 106(*) may, for example, contain information related to chip geometries, or other information in database 100. Primary REP 102 contains a pointer 110 to a chained list [106(1), 106(2) . . . 106(n)] of these SHAPE records, and each SHAPE record points to the container 107(*) of the actual data. The order of entries in the chained list may be explicit, where pointers are used to navigate between entries, or the order may be implicit, where the list entries are stored in a sequentially ordered queue. Deleted REP 103 contains pointers to each SHAPE 106(*) that has been deleted.

Figure 2A:
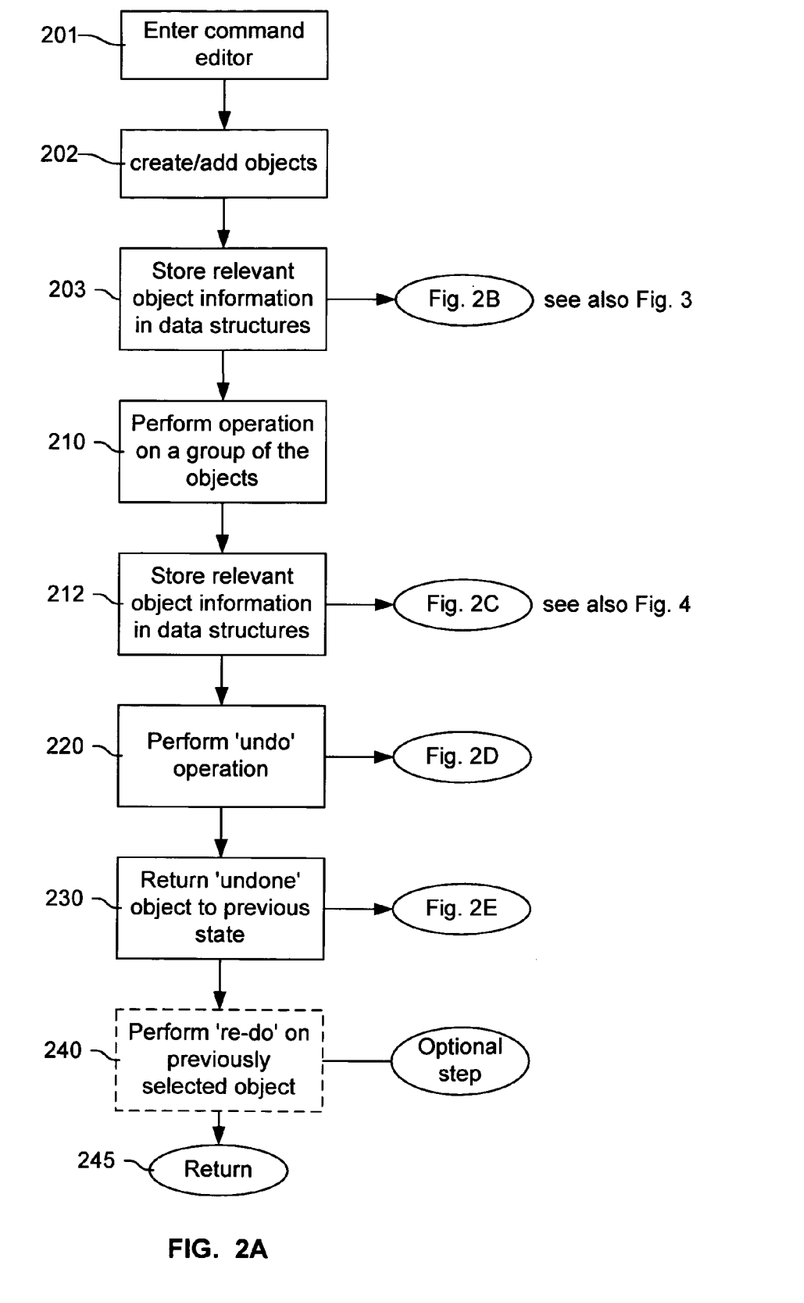
FIG. 2A is a flowchart showing an exemplary set of steps employed in performing one embodiment of the present method.

FIG. 2A is a flowchart showing an exemplary set of steps employed in performing one embodiment of the present method. As shown in FIG. 2, at step 201, a user enters a command using editor 10. The entered command may be, for example, a command to perform an 'add', 'delete', 'move', 'copy', or 'change' action on a particular object, graphical text entity or hierarchical REP, or the like. In step 202, the editor creates or adds the objects corresponding to the command entered by the user. At step 203, relevant object information necessary to restore an object to its previous state, such as offset of the move command, previous font size, is stored in the corresponding data structures, as described in detail in FIG. 2B. For example, new font size is stored in the corresponding graphical text object structure 107(*), and old font size is stored in the corresponding UNDOBJ 105(*).

Figure 2B:
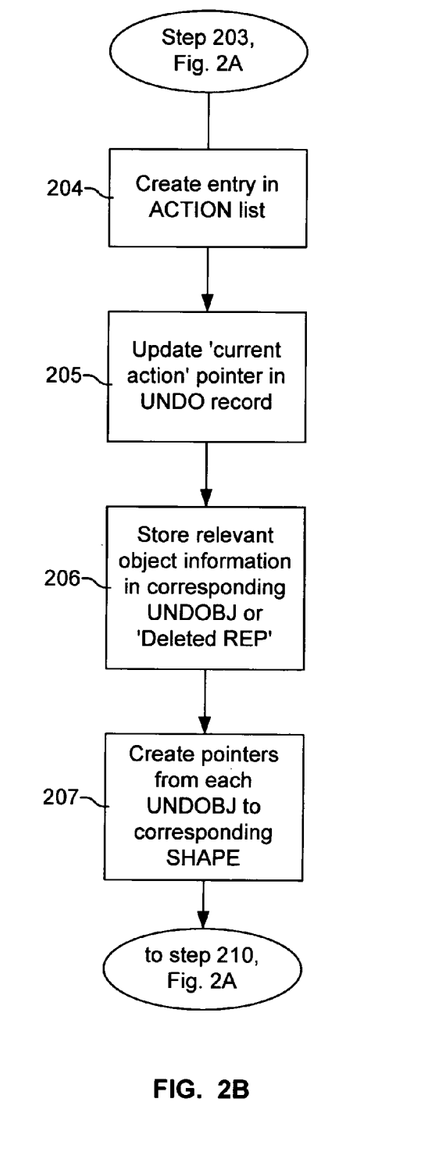
FIG. 2B is a flowchart showing exemplary details of the operations performed in step 203 of FIG. 2A.

FIG. 2B is an exemplary flowchart showing details of the operations performed in step 203 of FIG. 2A. As shown in FIG. 2B, at step 204, an entry corresponding to the object added or created in step 202 is added to ACTION list 104. At step 205, the 'current action' pointer 109 in UNDO record 101 is updated to point to the most recent editing action performed by the user. At step 206, initial restorative information necessary to restore each object, that was the subject of a group editing operation, to its initial state (i.e., its state prior to being a subject of the group editing operation) is stored in the corresponding UNDOBJ record 105(*), or in 'Deleted REP'. At step 207, pointers are created from each UNDOBJ 105 to the corresponding SHAPE 106. System operation then continues at step 210 in FIG. 2A, as described below.

As shown in FIG. 2A, at step 210, the user performs an operation on a group of existing objects. Then, at step 212, relevant object information is stored in the corresponding data structures, as described in detail in FIG. 2C.

Figure 2C:
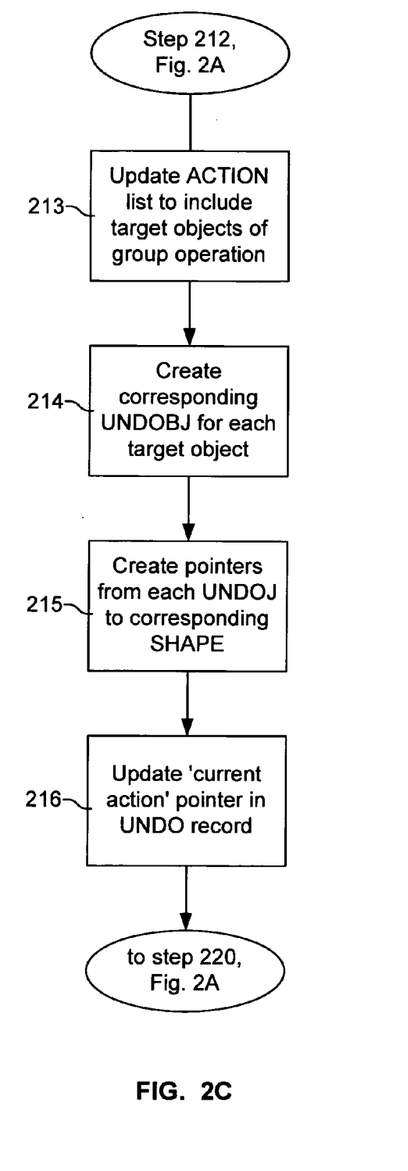
FIG. 2C is a flowchart showing exemplary details of the operations performed in step 212 of FIG. 2A.

FIG. 2C is a flowchart showing details of the operations performed in step 212 of FIG. 2A. As shown in FIG. 2B, at step 213, ACTION list 104 is updated to include target objects of the group operation that was just performed. For any region or group command, the first target object action in the current sequence or editing command is set to TRUE, all other target object actions in the operation are set to FALSE. Single commands (where a single object is moved or a unit of text is deleted) always have begincmd set to TRUE. At step 214, a corresponding new UNDOBJ 105 is created for each target object of the immediately previous group or region operation. Each new UNDOBJ 105 thus created contains group edit restorative information indicating the state, prior to the execution of the group editing action, of each of the objects that were subjects of the group editing action. At step 215, pointers are created from each UNDOJ 105 to the corresponding SHAPE 106. Then, at step 216, the 'current action' pointer is updated in the UNDO record 101. System operation then continues at step 220 in FIG. 2A, as described below.

Figure 2D:
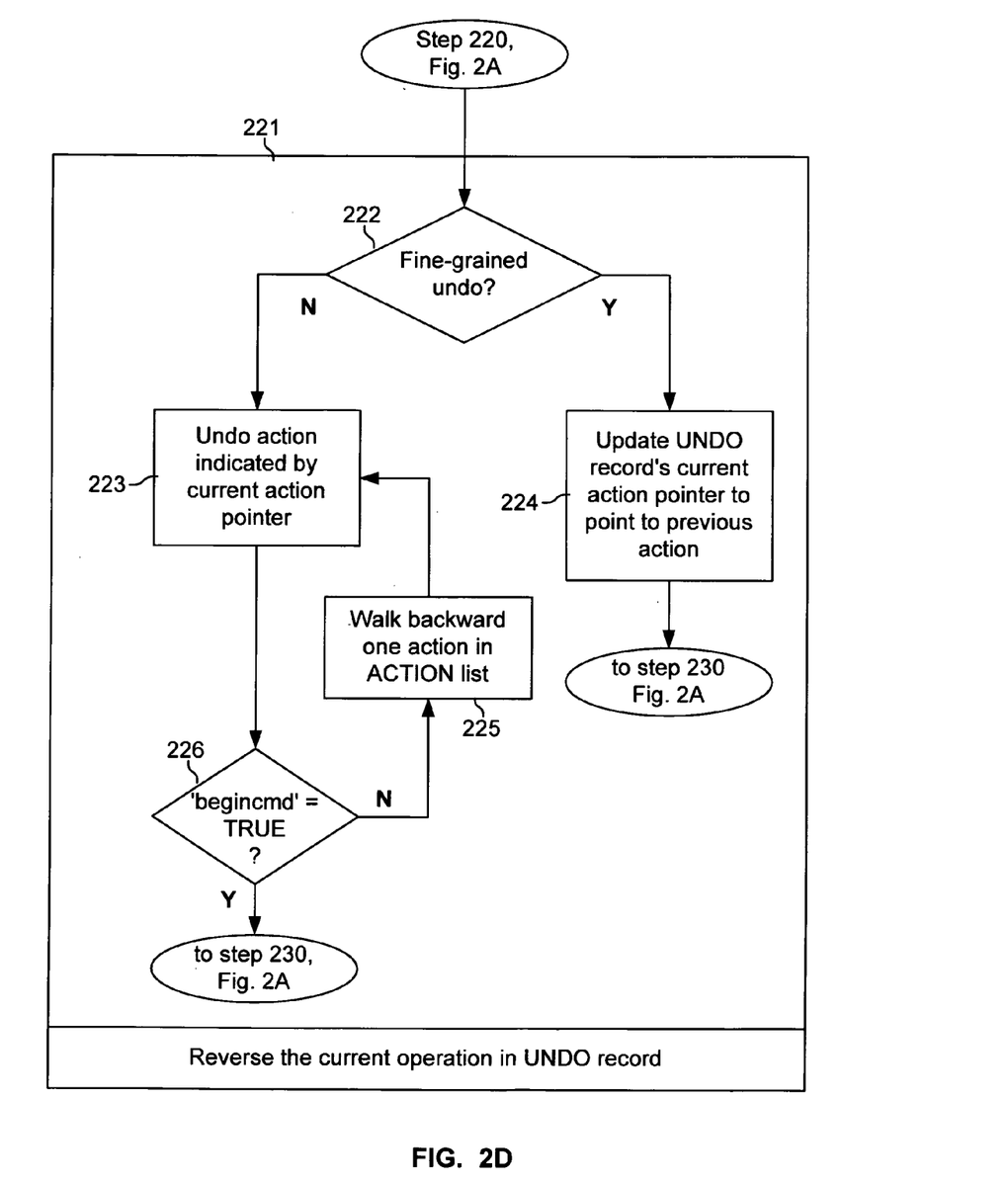
FIG. 2D is a flowchart showing exemplary details of the operations performed in step 220 of FIG. 2A.

As shown in FIG. 2A, at step 220, an undo operation is performed, as described in detail with respect to FIG. 2D.

FIG. 2D is a flowchart showing exemplary details of the operations performed in step 220 of FIG. 2A. As shown in FIG. 2D, in block 221, the current operation in UNDO record 101 is undone in accordance with steps 222-226, as described below.

At step 222, if the operation to be performed is a 'group undo' operation, then at step 224 the UNDO record's current action pointer 109 is updated to point to the previous action. System operation then continues at step 230 in FIG. 2A, as described below.

If, at step 222 it is determined that the operation to be performed is a 'fine-grained undo' operation, then at step 223 the action indicated by current action pointer 109 is undone. At step 226, if the 'begincmd' indicator is FALSE for the object currently pointed to by the ACTION pointer 109, then at step 225, the current action pointer 109 is set to the immediately previous action in ACTION list 104, and steps 223 through 225 are repeated for the action indicated by current action pointer 109. Otherwise, if the 'begincmd' indicator is TRUE for the object currently pointed to by the ACTION pointer 109, then system operation continues at step 230 in FIG. 2A, as described below.

Figure 2E:
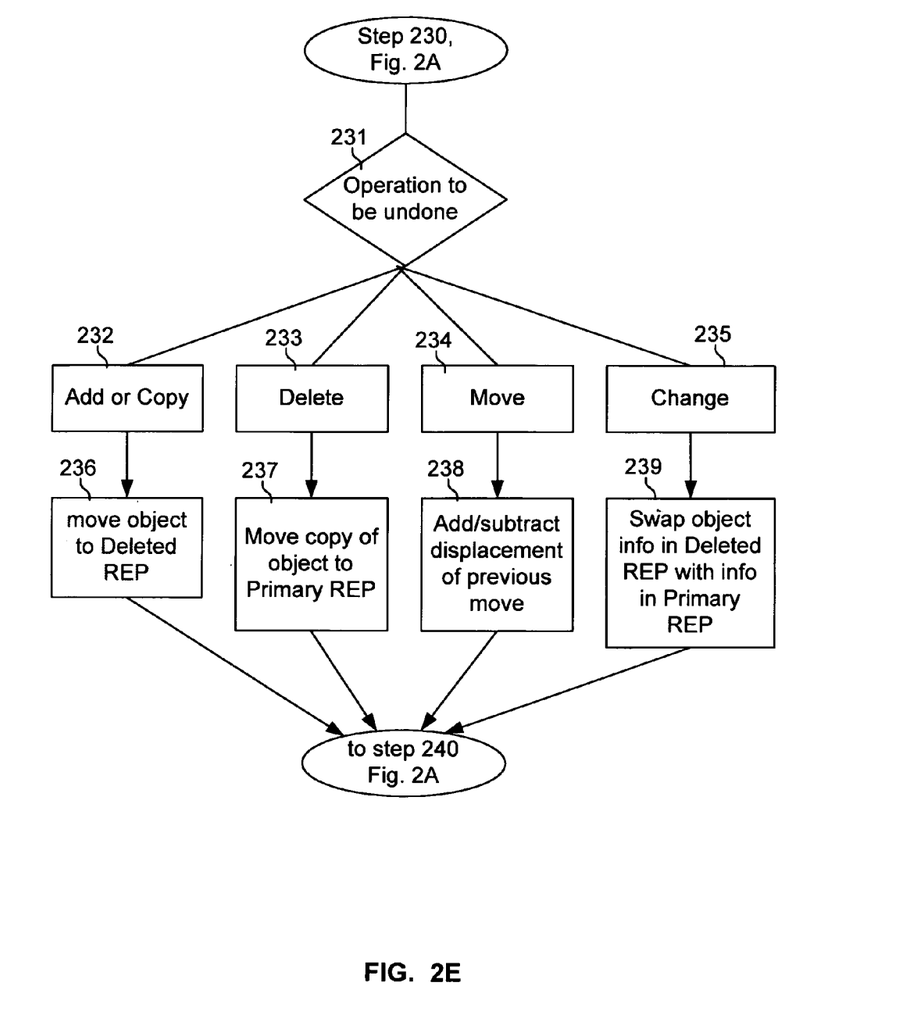
FIG. 2E is a flowchart showing exemplary steps performed in returning an 'undone' object to its previous state.

As shown in FIG. 2A, at step 230, the 'undone' object is returned to its previous state, as described in detail with respect to FIG. 2E.

FIG. 2E is a flowchart showing exemplary steps performed in returning an 'undone' object to its previous state. As shown in FIG. 2E, at step 231, the operation to be undone is first determined from the current action pointer 109, which points to the next object that is to be undone. If the operation to be undone is an add or copy operation (block 232), then at step 236, the object pointed to by the action pointer 109 is moved to Deleted REP. More specifically, the SHAPE record is moved to the Deleted REP so that a 'redo' can occur. The UNDOBJ then points to the SHAPE inside the Deleted REP so that a redo operation can be performed, if necessary.

If the operation to be undone is a delete operation (block 233), then at step 237, a copy of the object pointed to by the action pointer 109 is moved to Primary REP 102. A copy of the original data is maintained in the Deleted REP. If the operation to be undone is a move operation (block 234), then at step 238, the displacement of the previous move is added or subtracted according to the displacement value stored in the corresponding UNDOBJ record 105. If the operation to be undone is a 'change' operation (block 235), then at step 239, the object information in Deleted REP 103 is swapped with the object information in Primary REP 102, since a copy of the old information is maintained in Deleted REP 103. System operation continues at step 240 in FIG. 2A, as described below.

As shown in FIG. 2A, at step 230, a 're-do' may be optionally performed on the previously selected object. Finally, at step 245, control is returned to editor 10.

Figure 3:
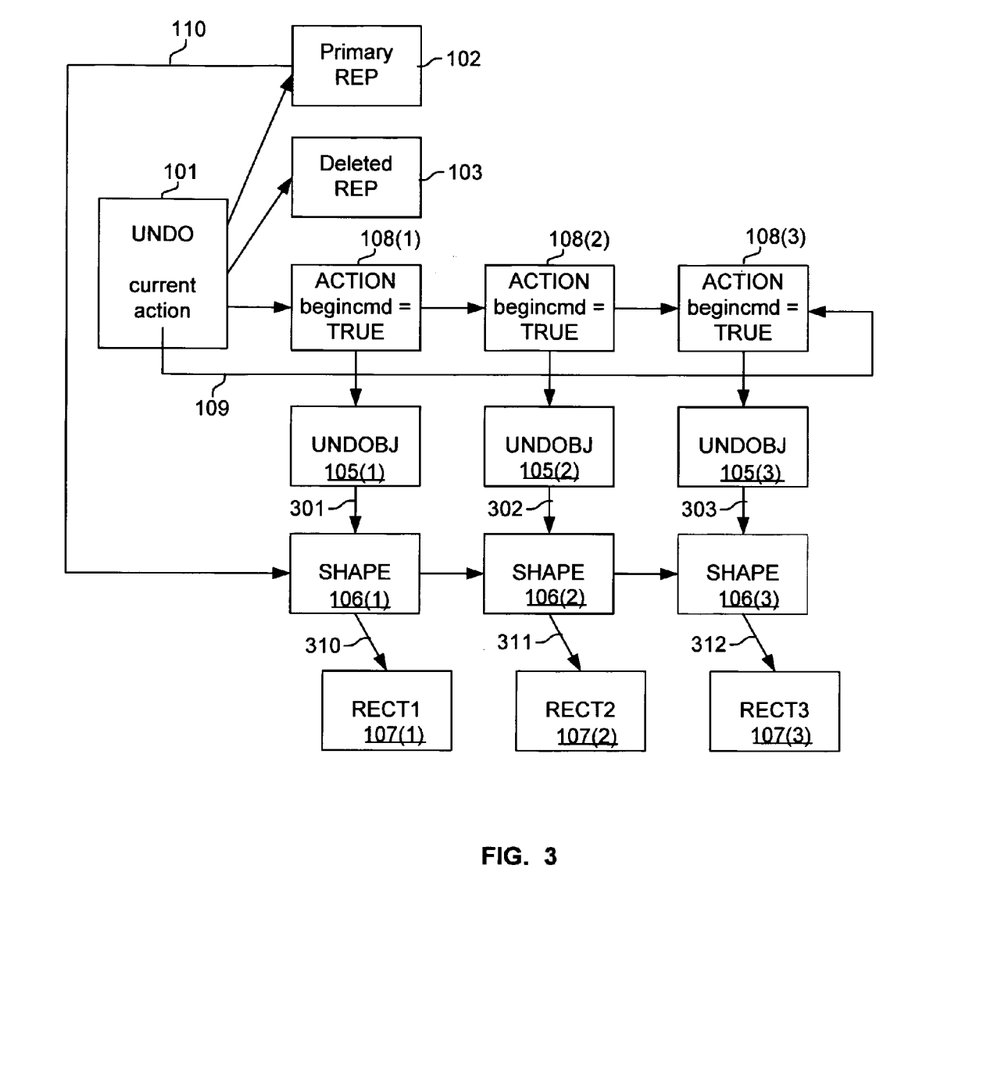
FIG. 3 is a diagram of an example showing data structures created as a result of three ADD operations.

FIG. 3 is a diagram of an example showing data structures created as a result of three ADD (or create) operations in which three rectangles, RECT1, RECT2, and RECT3, are added to a drawing using editor 10. FIG. 3 is best understood by viewing it in conjunction with FIG. 2B. As shown in FIG. 3 and FIG. 2B (at step 204), entries 108(1), 108(2), and 108(3), corresponding to the three ADDed objects, are added to ACTION list 104.

The 'current action' pointer 109 in UNDO record 101 is then updated to point to the most recent editing action performed by the user (step 205). Thus, pointer 109 is set to point to ACTION 108(3), as shown in FIG. 3. The 'begincmd' indicator 115 for each of the items 108(1)-108(3) in the ACTION list 104 is set to TRUE.

The original object data for each of the ADDed objects is then stored in the corresponding UNDOBJ record **105(\*), i.e., data for RECT1 (the first object ADDed) is stored in UNDOBJ 105(1), data for SHAPE2 (the second object ADDed) is stored in UNDOBJ 105(2), and data for RECT3 is stored in UNDOBJ 105(3)**.

Pointers 301, 302, and 303 are created from UNDOBJs 105(1)-105(3) to the corresponding SHAPE structures 106(1)-106(3) (step 207), and pointers 310-312 are also created from SHAPE structures 106(1)-106(3) to a corresponding structure (RECT1-RECT3) that contains data specific to a corresponding SHAPE **106(\*). Note that pointers 310-312 may be created at the time the RECTs are created. In an alternative embodiment, the data contained in SHAPE structures 106(\*) and the data contained corresponding RECT (or other shape) structures 107(\*)** may be combined into a single record.

Figure 4:
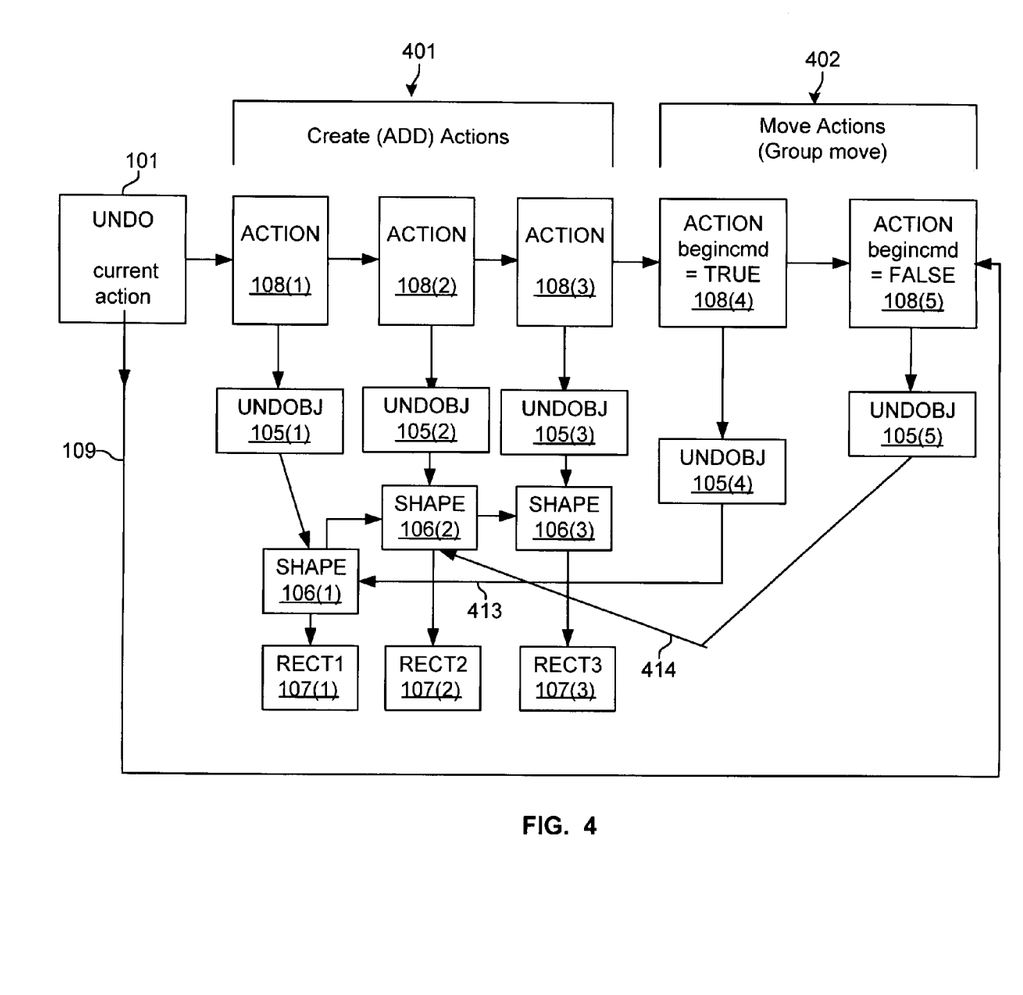
FIG. 4 is a diagram of an example showing data structures created as a result of a group or region MOVE of two of the objects ADDed in FIG. 3.

FIG. 4 is a diagram of an example showing data structures created as a result of a group or region MOVE of two of the objects ADDed in FIG. 3. More specifically, in this example, rectangles RECT1 [107(1)] and RECT2 [107(2)] are moved together, via a group move operation, to another part of the drawing. FIG. 4 is best understood by viewing it in conjunction with FIG. 2C. As shown in FIG. 4, ACTION list 104 is updated (at step 213 in FIG. 2C) to include target objects [RECT1 and RECT2] of the group move operation, as indicated by newly created ACTION list entries 108(4) and 108(5). The 'begincmd' indicator is then set to TRUE for the very first target object ACTION that was just created, and the remaining newly created target objects have their 'begincmd' indicator set to FALSE. In the present example, since only two objects were moved in the group move operation, only one 'begincmd' indicator [for ACTION list item 108(5)] is set to FALSE.

A corresponding new UNDOBJ 105 is created for each target object of the immediately previous group operation (at step 214). In the present example, UNDOBJs 105(4) and 105(5) are created, corresponding to SHAPE 106(1)/RECT1 and SHAPE 106(2)/RECT2.

Next, pointers 413 and 414 are created from the newly created UNDOBJ 105(4) and UNDOBJ 105(5), respectively, to the corresponding SHAPEs 106(1) and 106(2) (at step 215). Finally, the 'current action' pointer 109 is updated in the UNDO record 101 (at step 216) to point to ACTION list item 108(5).

Figure 5:
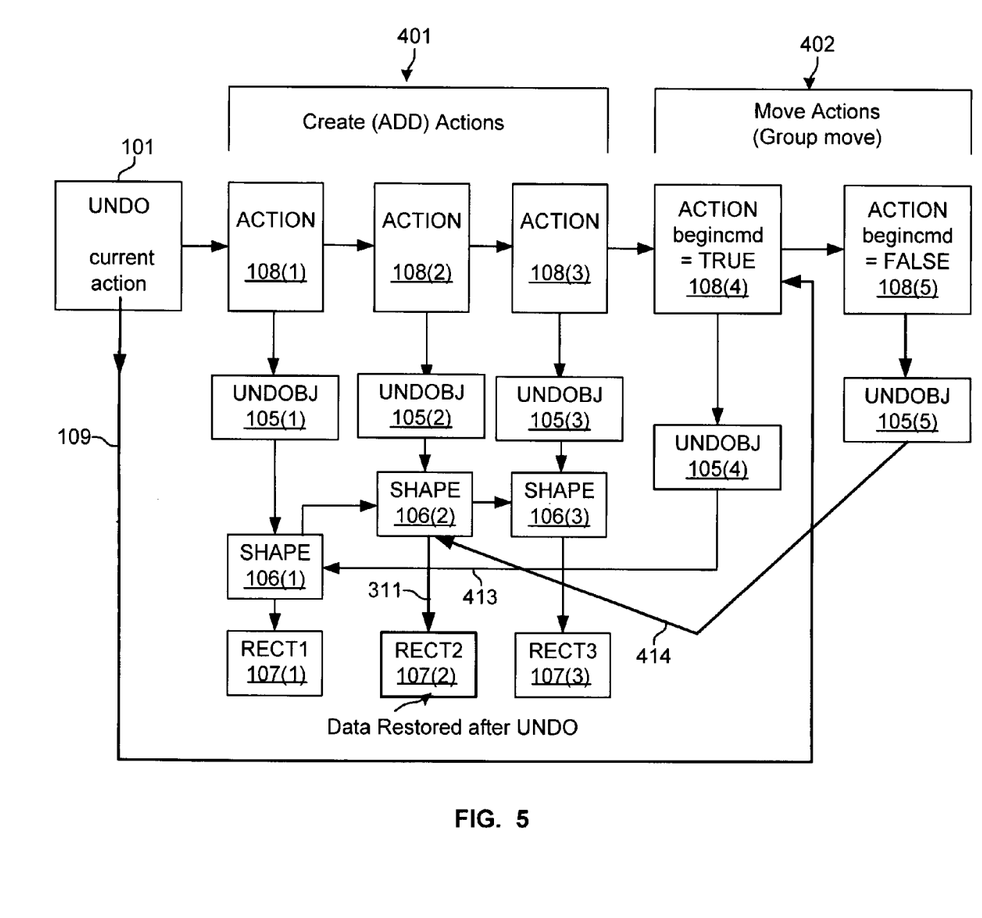
FIG. 5 is a diagram of an example showing the state of the data structures in FIG. 3 after a fine-grained undo operation has been performed on one action of a group operation.

FIG. 5 is a diagram of an example showing the state of the data structures in FIG. 4 after a fine-grained undo operation has been performed on one action of the previously performed group operation. FIG. 5 is best understood by viewing it in conjunction with FIG. 4 and FIG. 2D. As shown in FIG. 2D, it is first determined (at step 222) that the operation to be performed is a 'fine-grained undo' operation. Next, the single action indicated by current action pointer 109 (in FIG. 4) is undone (at step 223), i.e., RECT2 is moved back to its previous location prior to the group move operation. This is accomplished by restoring the data in RECT2 back to its previous state, using the original data stored in UNDOBJ 105(5), where the data for RECT2 is located by using pointers 414 and 311. If the 'begincmd' indicator is FALSE for the object currently pointed to by the ACTION pointer 109, then (at step 225), the current action pointer 109 is set to the immediately previous action in ACTION list 104. Therefore, in the present example, the UNDO record's current action pointer 109 is set to point to the next previous entry in the ACTION list, namely, entry 108(4), and control is returned to the user. ACTION list entry 108(5) and UNDOBJ 105(5) are not deleted at this point, so that the data contained therein may be used to 'redo' an action that was previously undone. An ACTION list entry and the corresponding UNDOBJ entry are only deleted when the Primary REP is removed from memory, or when some predetermined number of undo operations were performed and then additional operations are performed. In that case, all of the undone ACTIONS will be removed from memory to make room for the new ACTION list.

Table 1, below, shows exemplary pseudo-code that may be used to perform a fine-grained undo operation where only a single action of a group operation is undone. Each time an editor user invokes an 'undo' operation, a routine, such as the one below, is called. The routine undoes one complete action if a 'normal' group undo operation is selected; alternatively, if a fine-grained undo operation is selected, a single step of a group action is undone.

TABLE 1

```
{
ED_PTR_ACTION tmp_action = ED_get_pointer_undo_cur_action(
        undo_args->undo_obj);
if ( ! ED_check_undo_action_valid(undo_args))
        return FALSE;
/* Undo the thing the user did. */
switch (ED_get_state_action_type(tmp_action))
{
    case ED_ACTION_DELETE:
        status = ED_recover_delete_action(undo_args, tmp_action);
        break;
    case ED_ACTION_CREATE:
        status = ED_recover_create_action(undo_args, tmp_action);
        break;
    case ED_ACTION_CHANGE:
        status = ED_recover_change_action(undo_args, tmp_action);
        break;
    case ED_ACTION_MOVE:
        status = ED_recover_move_action(undo_args, tmp_action);
        break;
    case ED_ACTION_PULL:
        status = ED_recover_pull_action(undo_args, tmp_action);
        break;
}
        undo_args->undo_obj->curr_action =
            ED_get_next_undo_action(tmp_action);
        /* Walk down the ACTION list to the next action. */
tmp_action =
ED_get_pointer_undo_cur_action(undo_args->undo_obj);
if (ED_test_state_action_end_cmd_true(tmp_action))
{
        break;
}
/* If in undo single step mode, stop here*/
if ( undo_args->one_at_a_time && undo_args->obj_count > 0 )
            break;// User only wants a single action undone,
                    quit here.
        } /* the infinite loop is interrupted when the user
        requests the next action*/
```

Certain changes may be made in the above-described methods without departing from the scope of the present system. It is to be noted that all matter contained in the above description or shown in the accompanying drawings is to be interpreted as illustrative and not in a limiting sense. For example, the database shown in FIG. 1 may be constructed to include components other than those shown therein, and the components may be arranged in other configurations. The elements and steps shown in FIGS. 1-5 may also be modified in accordance with the methods described herein, without departing from the spirit of the system thus described.

What is claimed is:

1. A method of operating a computer system for restoring, to a previous state, a single object whose state was modified in a group editing action wherein a plurality of objects, including the single object, were modified as a group, the method comprising:

storing, prior to execution of the group editing action, initial restorative information necessary to restore each of the plurality of objects to its state prior to being modified by the group editing action;

storing, after execution of the group editing action, group edit restorative information indicating the state, after the execution of the group editing action, of each of the objects that were modified by the group editing action; and restoring the single object to said previous state in accordance with the group edit restorative information corresponding to the single object, in response to an indication that one of the plurality of objects is to be restored to said previous state.

2. The method of claim 1, further including:

storing primary indicia of the initial restorative information in a chained list; and appending to the chained list, after execution of the group editing action, additional primary indicia of the group edit restorative information indicating the state, after the execution of the group editing action, of each of the objects that were included in the group editing action;

wherein the group edit restorative information includes secondary indicia of members of a set of data structures, each of the members containing object data representing the present state of one of the objects modified by the group editing action.

3. The method of claim 2, including the step of restoring the single object to said previous state in accordance with object data indicated by the secondary indicia corresponding to the single object, in response to an indication that one of the plurality of objects is to be returned to said previous state.

4. The method of claim 3, including the step of restoring the single object to the state existing after the group editing action was performed, in accordance with the group edit restorative information corresponding to the single object.

5. A method of operating a computer system for restoring, to a previous state, a single object whose state was modified in a group editing action wherein a plurality of objects, including the single object, were modified as a group, the method comprising:

storing, in a first set of data structures, prior to execution of the group editing action, initial restorative information necessary to restore each of the plurality of objects to its state prior to being modified by the group editing action;

storing, in a second set of data structures, after execution of the group editing action, group edit restorative information indicating the state, after the execution of the group editing action, of each of the objects that were modified by the group editing action; and restoring the single object to said previous state in accordance with the group edit restorative information, stored in the second set of data structures, corresponding to the single object, in response to an indication that one of the plurality of objects is to be restored to said previous state.

6. A method of operating a computer system for restoring, to a previous state, a single object whose state was modified in a group editing action wherein a plurality of objects, including the single object, were modified as a group, the method comprising:

storing, in a first set of data structures, prior to execution of the group editing action, primary indicia of initial restorative information necessary to restore each of the plurality of objects to its state prior to being a subject of the group editing action;

storing, in a second set of data structures, after execution of the group editing action, secondary indicia of group edit restorative information indicating the state, after the execution of the group editing action, of each of the objects that were included in the group editing action;

locating the group edit restorative information using the secondary indicia corresponding to the single object; and restoring the single object, identified by the most recently stored secondary indicia, to its original state using the group edit restorative information.

7. The method of claim 6, including the additional step of restoring a second object identified by the next-to-most-recently-stored secondary indicia, to said original state, using the group edit restorative information stored in the second set of data structures.

8. The method of claim 6, wherein each of the data structures in the first set and the second set includes indicia of a third set of data structures containing data describing the shape of one of the plurality of objects.

9. A computer system for restoring, to a previous state, a single object whose state was modified in a group editing action wherein a plurality of objects, including the single object, were modified as a group, the computer system comprising a memory, the memory comprising:

a first set of data structures for storing, prior to execution of the group editing action, initial restorative information necessary to restore each of the plurality of objects to its state prior to being modified by the group editing action; and a second set of data structures for storing, after execution of the group editing action, group edit restorative information indicating the state, after the execution of the group editing action, of each of the objects that were modified by the group editing action;

wherein the computer system is configured to restore the single object to said previous state in accordance with the group edit restorative information corresponding to the single object, in response to an indication that one of the plurality of objects is to be restored to said previous state.

10. The computer system of claim 9, the memory including:

a third set of data structures, each of which contains data describing the shape of one of the plurality of objects and which is referenced by indicia stored in a corresponding one of the first set of data structures and the second set of data structures.

11. The computer system of claim 9, the memory including an undo data structure containing a pointer to the first set of data structures and a pointer to a next one of the plurality of objects that is to be restored to said previous state.

12. The computer system of claim 9, the memory including a deleted object data structure containing a copy of data describing an object that has been deleted in an editing operation.

13. A computer system for restoring, to a previous state, a single object whose state was modified in a group editing action wherein a plurality of objects, including the single object, were modified as a group, the computer system comprising a memory, the memory comprising:

a first set of data structures for storing, prior to execution of the group editing action, primary indicia of initial restorative information necessary to restore each of the plurality of objects to its state prior to being a subject of the group editing action;

a second set of data structures for storing, after execution of the group editing action, secondary indicia of group edit restorative information indicating the state, after the execution of the group editing action, of each of the objects that were included in the group editing action;

a third set of data structures in which the initial restorative information is stored; and a fourth set of data structures in which the group edit restorative information is stored;

wherein the computer system is configured to use the secondary indicia corresponding to the single object to locate the group edit restorative information, to restore the single object to its original state, in response to an indication that one of the plurality of objects is to be returned to said original state.

14. The computer system of claim 13, the memory including:

a fifth set of data structures, each of which contains data describing the shape of one of the plurality of objects and which is referenced by indicia stored in a corresponding one of the third set of data structures and the fourth set of data structures.

15. The computer system of claim 13, the memory including an undo data structure containing a pointer to the first set of data structures and a pointer to a next one of the plurality of objects that is to be restored to said previous state.

16. The computer system of claim 13, the memory including a deleted object data structure containing a copy of data describing an object that has been deleted in an editing operation.

17. The computer system of claim 16, the memory including an undo data structure containing a pointer to the first set of data structures, a pointer to a next one of the plurality of objects that is to be restored to said previous state, and a pointer to the deleted object data structure.

18. A computer-readable medium comprising instructions executable on a processor for employing a method for restoring, to a previous state, a single object whose state was modified in a group editing action wherein a plurality of objects, including the single object, were modified as a group, the method comprising:

storing, prior to execution of the group editing action, initial restorative information necessary to restore each of the plurality of objects to its state prior to being modified by the group editing action;

storing, after execution of the group editing action, group edit restorative information indicating the state, after the execution of the group editing action, of each of the objects that were modified by the group editing action; and restoring the single object to said previous state in accordance with the group edit restorative information corresponding to the single object, in response to an indication that one of the plurality of objects is to be restored to said previous state.

* * * * *